United States Patent [19]

Sato

[11] Patent Number: 5,328,539
[45] Date of Patent: Jul. 12, 1994

[54] RADIO FREQUENCY HEATING OF THERMOPLASTIC RECEPTOR COMPOSITIONS

[75] Inventor: Norman J. Sato, Maple Grove, Minn.

[73] Assignee: H. B. Fuller Licensing & Financing Inc., Wilmington, Del.

[21] Appl. No.: 784

[22] Filed: Dec. 31, 1992

Related U.S. Application Data

[60] Continuation of Ser. No. 853,262, Mar. 18, 1992, abandoned, which is a division of Ser. No. 619,084, Nov. 28, 1990, abandoned.

[51] Int. Cl.$^5$ .............................................. B05D 3/02
[52] U.S. Cl. ............................. 156/275.5; 156/275.7; 427/58; 427/516; 427/553; 427/591; 427/595
[58] Field of Search ............... 427/591, 516, 553, 595, 427/58; 156/275.5, 275.7

[56] References Cited

U.S. PATENT DOCUMENTS

| | | | |
|---|---|---|---|
| 3,936,412 | 2/1976 | Rocholl | 260/37 |
| 4,083,901 | 4/1978 | Schonfeld et al. | 264/25 |
| 4,253,898 | 3/1981 | Rinker et al. | 156/272 |
| 4,296,294 | 10/1981 | Beckert et al. | 219/10.41 |
| 4,360,607 | 11/1982 | Thorsrud et al. | 523/137 |
| 4,423,191 | 12/1983 | Haven et al. | 525/169 |
| 4,661,299 | 4/1987 | Thorsrud | 264/25 |
| 4,767,799 | 8/1988 | Thorsrud | 523/137 |
| 4,790,965 | 12/1988 | Thorsrud | 264/25 |
| 4,840,758 | 6/1989 | Thorsrud | 264/26 |
| 4,853,420 | 8/1989 | Pham et al. | 521/50 |
| 4,941,936 | 7/1990 | Wilkinson et al. | 156/274.8 |

FOREIGN PATENT DOCUMENTS 2248311 5/1975 France.

*Primary Examiner*—Bernard Pianalto
*Attorney, Agent, or Firm*—Merchant, Gould, Smith, Edell, Welter & Schmidt

[57] ABSTRACT

The present invention includes a thermoplastic receptor for radio signals having a frequency of about 1 to 100 MHz, the receptor having a dissipation factor of about 0.1 or greater. Also disclosed are heat meltable adhesives, film compositions, and composites comprising a thermoplastic and a thermoplastic receptor. The present invention also includes a method of applying a thermoplastic composition by applying radio signals having a frequency of about 1 to 100 MHz to a composition comprising a thermoplastic composition and a receptor.

22 Claims, 2 Drawing Sheets

RADIO FREQUENCY HEATING OF THERMOPLASTIC RECEPTOR COMPOSITIONS

This is a continuation of application Ser. No. 07/853,262, filed Mar. 18, 1992, now abandoned, which was a continuation of U.S. patent application Ser. No. 07/619,084, now abandoned.

FIELD OF THE INVENTION

The invention generally relates to methods for applying thermoplastic compositions. More specifically, the present invention relates to compositions and methods for the applying of thermoplastic compositions through heating by the application of electromagnetic radiation having a frequency in the radio spectrum. These thermoplastics comprise novel receptors which upon activation generate heat. The compositions and methods of the present invention are useful in the creation of adhesive bonds, films, fiber resin composite suitable for many applications in various industries including general adhesive applications in the automobile industry, the aerospace industry and the like.

BACKGROUND OF THE INVENTION

One of the first applications of using radio waves to produce heat was in the area of medical diathermy or the heating of muscle and skin tissue by radio waves. Radio waves were used in this context for the treatment of arthritis at the beginning of the century. In the adhesives industry, the first radio frequency cure application with water based adhesives dates back to the late 1930's in the lumber industry. At this time, boards were being pressed with steam heated platens into plywood sheets. Veneers were being hot pressed into curved shapes with hand tool metal molds. Switching to radio frequency heating equipment saved money, time, energy and materials, by eliminating the steam platens. This new technology was immediately accepted by the wood working industry.

The rapid radio frequency cure of plywood was invaluable during World War II. Examples of applications for radio frequency cured water based adhesives in plywood products include items such as the P.T. boat and the British mosquito bomber airplanes. The radio frequency cure industry continued to grow rapidly in the 1950's. The wood and lumber industries converted more and more to radio frequency. Plastic welders, heat sealers and resin heaters to dry and relieve physical stresses in thermoplastics were developed. Rubber vulcanizing systems and compression molding techniques for the tire industry were also developed.

A representative sample of the present state of the art includes Haven et al, U.S. Pat. No. 4,423,191, which teaches the applying of thermoplastic resins such as polyurethanes, phenolics, polyesters, and epoxies through the use of dielectrically lossy particles to which an electric field having a frequency ranging from 1 MHz to 30 GHz is applied.

Wilkinson et al, U.S. Pat. No. 4,941,936, disclose a process for using dielectric heating in the manufacture of reinforced plastic automotive body parts. Thorsrud et al, U.S. Pat. No. 4,360,607, discloses a sensitizing concentrate generally comprising four constituents including (1) polymeric alkylene glycols and their mono- and di-alkyl ethers, (2) alcohol amines and their hydrocarbyl substituted derivatives, and optionally, (3) silica, and (4) a "plastomer", i.e., an elastomer such as a butadiene-styrene copolymeric rubber. Thorsrud, U.S. Pat. Nos. 4,661,299, 4,767,799 and 4,790,965, also disclose compositions intended to enhance the radio frequency sensitivity of moldable compositions such as zinc oxide, bentonite clay, and crystalline or amorphous alkali or alkaline earth metal aluminsilicate. Further, Thorsrud, U.S. Pat. No. 4,840,758, discloses a method for preparing molded thermoplastic articles including the steps of admixing a radio frequency energy sensitizing agent, namely, N-ethyl toluene sulfonamide into a thermoplastic polymer to provide a mixture having moldable consistency.

Pham et al, U.S. Pat. No. 4,853,420, discloses polymers which are readily susceptible to high frequency radiation, from about 0.1 to about 30,000 MHz as a means of heating these thermoplastic polymers to a pliable consistency. Beckert et al, U.S. Pat. No. 4,296,294, disclose a mechanism for drying aqueous based adhesives based on varying the energy in a radio frequency field to effectively promote the evaporation of water from the adhesive used in bookbindings. Schonfeld et al, U.S. Pat. No. 4,083,901, disclose a process for applying polyurethane elastomers.

Toa Gosei Chem Ind. Ltd., Japanese Patent No. 2,086,672, discloses an adhesive complex comprising polypropylene which optionally may contain an ethylenepropylene copolymer, an alpha, beta ethylenically unsaturated carboxylic acid or its anhydride, a radical initiator, and fine metallic particles. Maeda et al, U.K. Patent Application 2,200,128A, discloses a polyphenylene oxide resin composition suitable for high temperature dielectric applications. Gauvin et al, "Forging and R-F Assisted Processing of UHMW Polyethylene, Two Alternatives for Shorter Cycles and High Performance", compares radio frequency assisted processing and forging processing of thermoplastic compositions.

Radio frequency has been applied to various other adhesives with little or no commercial success. Urethanes, resin composites, epoxies, dental acrylics, and epoxy adhesives, were all subjected to experimentation of radio frequency cure. Moreover, polyesters, silicons, polyolefins generally, polystyrene, rigid polyvinylchloride, acrylics, polycarbonates, urethanes, generally epoxies, fiberglass, are among those compounds that are not sensitive to radio frequency energy. The use of radio frequency to cure solely the adhesive composition generally failed due to a lack of appropriate equipment as well as an absence of appropriate electrical and chemical properties in the materials to be applied.

SUMMARY OF THE INVENTION

The present invention provides compositions and processes which may be used to melt, apply or form thermoplastic compositions on demand at a substantial savings in costs. The compositions and methods of the present invention provide for the heat application of thermoplastic compositions within the localized volume where an effective concentration the radio frequency receptor is located. As a result, not only is unnecessary heating of the surrounding environment avoided, but moreover, flammable substrates as well as resins may be left substantially unaffected by processing. The compositions and methods of the present invention reduce heat distortion, warpage, or "read through" on the substrates of application. The bond line is the sole situs of heat and not the substrate. Rather the substrate acts as a heat sink.

The system of the present invention places a RF applicable composition between a source of RF energy and a conductive surface. The RF energy passes from the source through the RF applicable composition to the conductive surface. The RF source can be an antenna or plate, conductive substrates or other RF source. The conductive, receiving surface may be an antenna or plate, conductive substrate or any other effective RF receptor. The present invention allows application of thermoplastic compositions on demand at a lower cost in materials as well as power consumption. The composition of the present invention is capable of applying or forming thermoplastic compositions having a higher melting point than the melting point or heat distortion temperature of the substrate to which they are applied due to the localized activation of the thermoplastic through the radio frequency receptor. Moreover, methods and compositions of the present invention provide a means of applying thermoplastic compositions regardless of the thickness or the polarity of the substrates.

The present invention resides in part in a thermoplastic receptor for radio signals having a frequency of about 1 to 100 MHz. The receptor of this invention has a dissipation factor of about 0.1 or greater. The present invention also comprises heat applicable films, adhesive compositions, and composites. Methods of applying thermoplastic compositions through the application of radio signals having a frequency of about 1 to 100 MHz to compositions having a receptor where the substrate of application can be used to transmit the activating energy to the receptor laden composition.

DETAILED DESCRIPTION OF THE INVENTION

Figure 1:
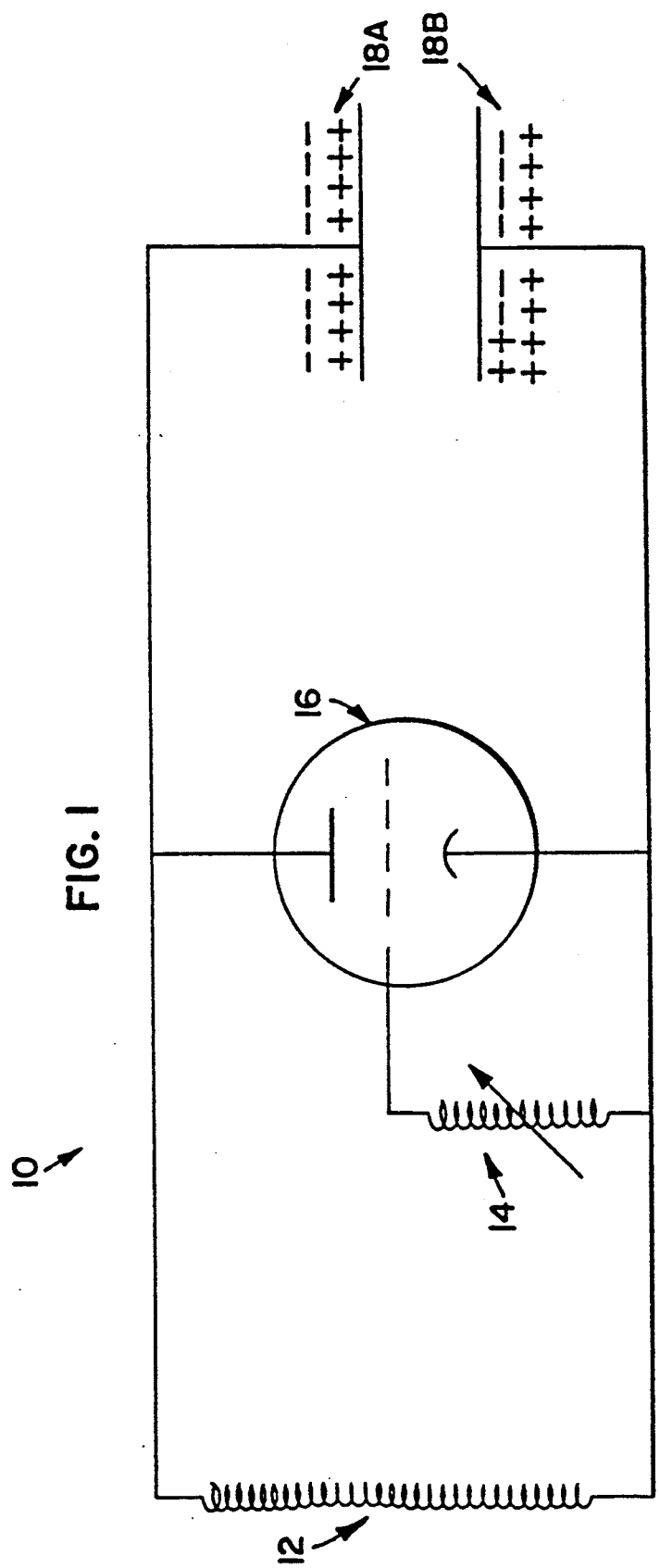
FIG. 1 is a schematic representation of a modified Hartley circuit.

The present invention comprises a radio frequency receptor, compositions including a radio frequency receptor and thermoplastic compositions, and methods of applying thermoplastic compositions using a radio frequency receptor.

Receptors

Generally, the receptors of the present invention function to absorb radio waves transmitted through a receptor laden heat applicable thermoplastic composition. By absorbing the radio waves, the receptors, in turn, transform radio energy into heat energy which melts and promotes application of the thermoplastic compositions. Previously, radio frequency work has focused on the dielectric constant of various receptor compositions. However, I have found that in the relationship of dielectric constant, loss tangent, and dielectric loss factor, both loss tangent and dielectric loss factor have a significant impact on the system. Dielectric constant is related to loss tangent and dielectric loss factor by the following equation:

Dielectric Loss Factor = Dielectric Constant × Dissipation Factor

The dielectric constant is a measure of the energy storage capability of the material. The Dissipation Factor is the ratio of the energy dissipation (or loss) capability of the material to its energy storage capability. In previous instances, the primary focus has been upon dielectric constant, i.e., the ability of the material to accept and store charge. However, important to a receptor composition is the ability of that composition to not only absorb and store charge but to also dissipate that charge or lose that charge to the surrounding material.

This dissipation factor or dielectric loss factor is a measure of the ability of the receptor to dissipate energy in the form of heat to the surrounding material. Reliance solely upon dielectric constant may result in a receptor which will store energy continually without any resulting dissipation.

Generally, compositions useful as receptors in accordance with the present invention include those which have a dissipation factor of at least 0.1 or greater when exposed to radio waves of a frequency of from 1 MHz to 100 MHz. Moreover, the compositions in accordance with the present invention which will most preferably serve as receptors should have a dissipation factor ranging from about 0.1 to over 100, preferably from about 0.1 to about 50, and most preferably from about 0.1 to about 5. Receptors of the present invention may also have a dielectric constant ranging from about 0.1 to over 2000.

Examples of receptors which have been found useful in accordance with the present invention are believed to work by way of one of two of the following mechanisms. First, useful receptors ("kinetic receptors") have been found to work through a kinetic mechanism where the addition of a higher concentration of receptor within the thermoplastic composition results in an increased amount of heat towards that level desired in the specific application.

Receptors useful in the present invention have also been found to work in a complementary manner with the activating radio frequency plate or antenna. Specifically, the more plate or antenna area to which the "complementary receptor" treated composition is exposed, the lower the concentration of receptor necessary to create the amount of desired heat. In contrast, the lesser area of antenna or plate available to activate the receptor treated composition, the higher the concentration of receptor necessary to treat and create the desired heat given a fixed distance between plates. In this capacitive relationship, the amount of energy exposed to the receptor treated composition inversely determines the concentration of receptor necessary within the composition itself.

Generally, any composition which has a dielectric constant, dissipation factor and is capable of absorbing radio waves at the frequencies detailed above may be used in accordance with the present invention. Compositions which have been found to be most useful in accordance with the present invention include compounds both with and without bound molecular water.

Those compounds having bound molecular water include alkali and alkaline earth metal sulfate salts and aluminum trihydrate. Sulfate salts such as calcium sulfate are believed to work through a kinetic mechanism where the concentration of the calcium sulfate is varied based on the amount of heat desired and the composition of use. Generally, the composition of calcium sulfate ranges from about 0.1 wt-% to 40 wt-%, preferably from about 0.1 wt-% to 10 wt-% and most preferably from about 0.1 wt-% to 6 wt-%.

Turning to aluminum trihydrate, this receptor is also believed to also work through kinetic action wherein the concentration may be varied depending upon the amount of heat to be delivered to the resulting composition. Specifically, the concentration of aluminum trihydrate may vary broadly from about 1.0 wt-% to 60 wt-%, preferably 8 wt-% to 12 wt-%, and is most preferably about 10 wt-%.

Receptors useful in the present invention may also comprise those without bound molecular water such as polystyrene sulfonate sodium salt, quaternary ammonium salts, as well as phosphonate compounds and phosphate compounds.

The concentration of polystyrene sulfonate sodium salt may be varied depending on the area of the receptor laden substance exposed to the antenna or radio frequency generating plate. Generally, the concentration of polystyrene sulfonate sodium salt may vary from about 0.1 to 20 wt-%, preferably from about 0.3 to 4 wt-% and most preferably from about 0.5 to 2 wt-%.

Other compounds also useful as receptors in accordance with the present invention are phosphate and phosphonate compounds. Generally, phosphate compounds useful in the present invention are those having a large enough dipole character to be receptive to the given frequency of radio waves introduced into the system. Phosphate compounds which may adequately work as receptors include tricresyl phosphate, tributyl phosphate, propylated triphenyl phosphate, and tri $(\beta,\beta$ dichloro isopropyl) phosphate among others.

Moreover, any phosphonate compound having a phosphate-oxygen bond with enough dipole character to be receptive to the frequency of energy introduced into the system may be useful in accordance with the present invention. Phosphonate compounds which have been found useful in accordance with the present invention include dimethyl methyl phosphonate, trichloropropyl phosphonate, diethyl 2-hydroxy ethyl amino phosphonate, and the like. Generally, the concentration of these compounds will range from about 0.1 wt-% to 25 wt-%, preferably from about 0.5 wt-% to 10 wt-% and most preferably from about 1 wt-% to about 7 wt-%.

Receptors of the present invention may also comprise any quaternary ammonium salt having the chemical and electrical properties previously outlined. Generally, those quaternary ammonium salts which are though to be most useful are those of the general formula $CH_3CH_2N(CH_3)_2R$ wherein R is a $C_{10}$ to $C_{24}$ branched or linear alkyl. In especially preferred quaternary salt is CA100 available from Aceto Chemical Co. of New York. The concentration of the quaternary ammonium salts generally ranges from about 0.1 to 15 wt-%, preferably from about 0.3 to 10 wt-% and most preferably from about 0.5 to 1.5 wt-%.

While the quaternary ammonium salts are generally soluble in the resin, it is often desirable to use a plasticizer to make the salts soluble. In these instances, a plasticizer may generally be added at the rate of up to 8 parts plasticizer for every 2 parts quaternary ammonium salt wherein the concentration of quaternary ammonium salt is within the ranges detailed above. Useful plasticizer compositions include any composition which will effectively solubilize the quaternary ammonium salt within the given resin such as phosphates and phosphonates, polyols such as 1,4-butanediol, dioctyl phthalate ethylene glycol, and propylene glycol are all examples of compositions which may be useful in solubilizing quaternary ammonium salt receptors of the present invention.

Thermoplastic Compositions

Thermoplastic compositions that may be used with the receptors of the present invention include vinyl polymers, polyesters, polyamides, polyimides, polyamide-imides, polyethers, block polyamides-polyethers, block polyesterspolyethers, polycarbonates, polysulfones, poly bisimidazoles, polybisoxazoles, poly bisthiazoles, and polyphenyl polymers. Other useful thermoplastics include nylons, polyacetals, polyester elastomers, polyurethanes, polyphenyl-aniline sulfides, polypropylenes, polyether ether ketones, as well as elastomeric thermoplastics including butyl rubber, ethylene vinyl acetate copolymers, as well as SOS, SBS and SIS block copolymers and the like. Especially preferred are polycarbonates, and polyolefins such as polypropylene, as well as polyimides.

Vinyl polymers useful in the present invention, include polyethylene, polypropylene; rubbery polymers and copolymers prepared from monomers including ethylene, propylene, styrene, acrylonitrile, butadiene, isoprene, and others, acrylic acid, methacrylic acid, methylacrylate, methylmethacrylate, vinyl acetate, hydroxy methacrylate, hydroxy ethylacrylate, as well as other known vinyl monomers.

Also useful as thermoplastics with the receptors of the present invention include thermoplastic saturated polyesters made from di- or tri- carboxylic acid in combination with di- or tri- hydroxy compounds.

Composites

The receptor compositions of the present invention may also be used in composites generally comprising the thermoplastic compositions outlined above and insoluble filler or fiber compositions. Generally, the composite may comprise at least one fiber and a thermoplastic. Fiber components can be monofilament, multifilament fibers, yarns, woven, nonwoven, and unidirectional composite fibers. Generally, composite fibers that can be used in combination with thermoplastics and the receptor of the present invention to create a unitary object through processes known to those of skill in the art including glass fibers, carbon fibers, or graphite fibers. Also useful are polyester mats, glass mats, carbon mats and graphite mats which may be woven or nonwoven as is intended for any given application.

Generally, these composite articles may be manufactured by any means known to those of skill in the art and in the fabrication of a composite, the concentration of the composite fiber will range from about 0.1 wt-% to about 99 wt-%, preferably from 5 wt-% to 40 wt-% and most preferably from about 10 wt-% to 20 wt-%.

Application of Radio Frequency Energy

Generally, the receptors of the present invention may be activated by any device capable of directing electromagnetic energy having a frequency ranging from about 1 megahertz to 100 megahertz (MHz) into the receptor containing thermoplastic. Radio waves within this frequency may be generated through a modified Hartley circuit 10, FIG. 1. A modified Hartley circuit 10 may generally comprise a frequency coil 12, tuning coil 14, oscillatory tube 16 and two opposing plates 18A and 18B. In use, the sample is generally positioned between these two plates, 18A and 18B, and the energy passes through the sample from plate to opposing plate.

Figure 2:
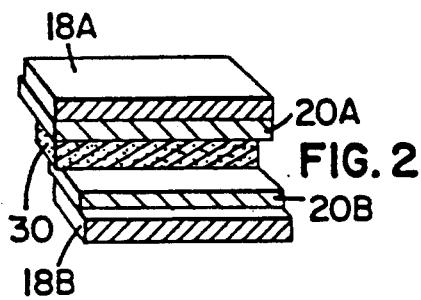
FIG. 2 is one embodiment of the method of the present invention depicting the application of radio frequency waves in a direction parallel to the receptor laden resin.

While a modified Hartley circuit 10 is possibly the most simple and well known circuit used for the creation of radio waves having the given frequency of 1 MHz to about 100 MHz, any other device capable of producing radio waves of this frequency may also be used in accordance with the present invention. Generally, the receptors within a given thermoplastic resin may be activated by positioning the receptor containing resin 30 between two substrates 20A and 20B which are in turn positioned between the two opposing plates or electrodes 18A and 18B, see FIG. 2. In noncomposite applications, the resin 30 may be laid on the substrate of application, which in turn may be positioned with the largest dimension of the adhesive 30 parallel to the opposing plates 18A and 18B, FIG. 2.

Figure 3:
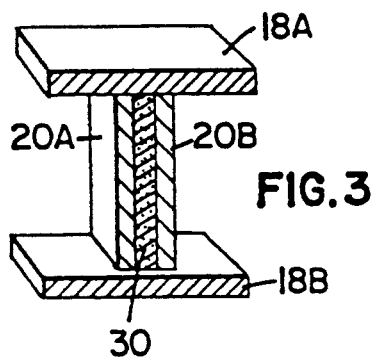
FIG. 3 is an alternative embodiment of the method of the present invention depicting application of radio frequency waves in a direction perpendicular to the orientation of the receptor laden resin.
Figure 4:
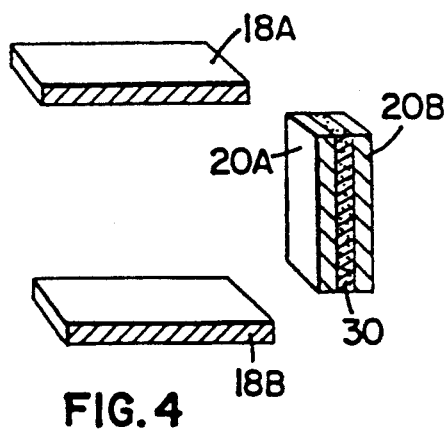
FIG. 4 is a further alternative embodiment of the method of the present invention depicting the application of radio frequency waves to the receptor laden resin through stray field waves.

The resin containing substrates 20A and 20B may also be positioned between and perpendicular to the opposing plates 18A and 18B, FIG. 3. The substrates 20A and 20B may also be positioned outside of the space between the opposing plates so as to be activated by radio waves which stray beyond the field created between the two plates, FIG. 4. This last application of energy is called stray field activation. In composite applications these three schemes are equally applicable to compositions held in molds by varying the position of the molds accordingly.

Figure 5:
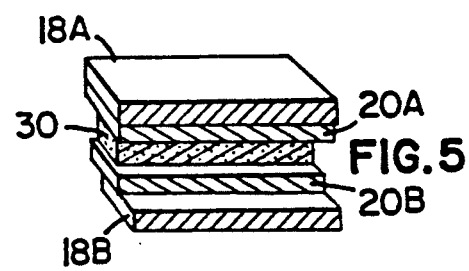
FIGS. 5, 6 and 7 depict various alternative embodiments of the application of radio frequency waves to the receptor laden resin stemming principally from the embodiment shown in FIG. 2.
Figure 6:
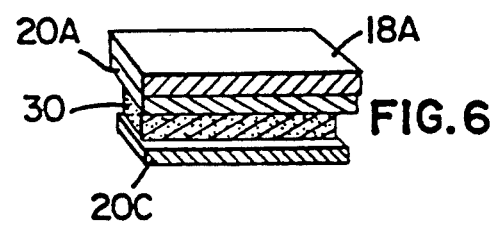
Figure 7:
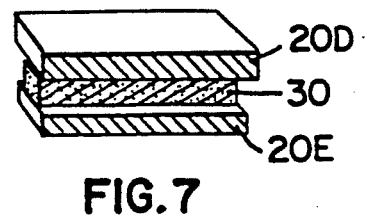

When the resin is placed within the field between the two opposing plates, various combinations of plates and substrates may be used in activating the receptors and, in turn, heating and melting the thermoplastic compositions of the present invention, see FIGS. 5-7.

For example, as previously defined, the most simple means of activating receptors in accordance with the present invention is the use of a modified Hartley circuit 10 having conductive opposing plates. If the receptor laden thermoplastic 30 of the present invention is to be used as an adhesive, two opposing substrates 20A and 20B having the receptor laden resin 30 in between them may be inserted between the opposing plates 18A and 18B, FIG. 5. The plates 18A and 18B, being conductive, act to effectively transmit energy waves through the substrates 20A and 20B, activating the receptor. The adhesive 30 is heated and melted, ultimately bonding the two substrates 20A and 20B.

The present invention also provides for the use of a single conductive substrate or two conductive substrates to be used instead of the plates, FIGS. 6 and 7. In these two instances, the opposing conductive plates are either partially or completely obviated. For example, it is possible to use a conductive plate 18A in combination with two substrates 20A and 20C wherein substrate 20C is conductive. The opposing lead for the radio frequency applying system is merely attached to the conductive substrate 20C so that energy will flow from the charged plate through the receptor laden thermoplastic composition to the conductive substrate 20C. Substrate 20C may be made conductive through the application of embedded metal foils, fibers or particles. Conductive particles may also be applied by aerosol or pump spray. Alternatively, an inherently conductive substrate may be used such as a metal or metal alloy.

This design or method of applying radio frequency energy towards heating and melting thermoplastic compositions is applicable in situations where a two plate system is not practical due to constraints created by logistic, space, etc. considerations which prevent the inclusion of two opposing conductive plates. Such applications are often found in the automotive, aerospace, and marine industries. An opposing lead is merely attached to the substrate in which the receptor laden thermoplastic composition is to be applied so as to provide a proper alternating lead or plate so that the radio frequency energy will actually pass through the receptor laden thermoplastic composition which is laid against the first opposing conductive plate.

The present invention also allows for the application for radio frequency energy to compositions which comprise two conductive substrates, FIG. 7. Here again, the substrates 20D and 20E may be the intended surfaces of application, such as in the case of a film or adhesive. Alternatively, the substrates may be a mold for the production of a composite article. For example, if an adhesive application is intended, two opposing substrates 20D and 20E may be bonded to each other using those substrates as the conductive plates which would normally emit and receive the radio frequency energy. In this instance, the receptor laden thermoplastic 30 may be generally applied to one of the substrates in the intended position. The other substrate is then placed approximately adjacent to this lower substrate in its intended position. Leads are then attached to the respective substrates 20D and 20E and energy is transmitted through the receptor laden thermoplastic composition 30. The substrates may be made conductive or may be inherently conductive as noted earlier. Composites may be similarly formed by using electrically conductive molds.

The use of such conductive substrates may be found applicable in any number of industries including those which require metal to metal bonding or metal to dielectric bonding, where the dielectric is something such as wood, plastic, paper and the like. Such industries include the aerospace, marine, and automotive industry in applications such as bumper bonding and molding, carpet bonding, and headlamp molding; the aeronautical industry in applications such as the assembly and manufacture of interior and exterior components.

Generally, the receptors of the present invention may be activated by a frequency ranging from about 1 to 100 MHz, preferably from about 3 to 80 MHz, and most preferably from about 3 to 35 MHz. The most preferred frequency for operation of the receptors of the present invention is about 27.12 MHz. An additional advantage of the present invention is the ability to activate receptors without the use of high voltage electricity. Specifically, voltages ranging from about 100 to 500,000, preferably from about 1000 to about 100,000, and most preferably from about 1000 to 50,000 may be used to activate the receptors of the present invention. Generally, the spacing of the radio wave generating plates ranges from about 0.001 inch to 20 inches, preferably 0.005 inch to 12 inches, and most preferably from 0.030 inch to 6 inches. In use, the radio waves are generated from the circuitry with an amperage ranging from about 0.05 amp to 5 amps, preferably from about 0.1 amp to 1 amp, and most preferably from about 0.2 amp to 0.4 amp.

Generally, once receptors are loaded into the thermoplastic compositions of choice, the thermoplastic may be activated instantaneously merely by the application of energy having the correct frequency to activate that composition. The actual time of activation will depend upon the required heat to melt the adhesive as well as the design of the plates used to provide the radio waves and the volume of thermoplastic composition to be applied. Generally, the time of application will range from about 0.01 to 60 minutes, preferably from about 0.1 to 15 minutes, and most preferably from about 0.1 to 6 minutes.

While a modified Hartley circuit may be used to complete the processes of the present inveniton, an especially preferred machine is a Workrite 300 made by Workrite Co. of Berkley, Cal. I have found that this machine is especially applicable to stray field applications providing 1000 volts and 300 watts.

Applications

The receptors of the present invention may be used to cure a variety of thermoplastic compositions which may be used in any number of applications including the use as films, adhesives or in the manufacture of unitary composite articles. Generally, receptors can be used in thermoplastic compositions towards the production of plastic bonds, plastic to metal bonds, metal to metal bonds, wood to metal or plastic, and the like. The thermoplastic receptor compositions of the present invention may also be used for paper to paper, metal, and plastic for bonding of parts in the aerospace, aircraft, marine, furniture, automotive, rail, appliance, construction, packaging, and general assembly markets.

Plastic substrates which may be adhered to by film coating or adhesion include polycarbonate substrates, acrylic substrates, polyvinyl chloride substrates, ABS substrates, polyolefins such as polypropylene substrates, polyethylene substrates, phenolic substrates, polyamide substrates, polyimide substrates, epoxy substrates, polysulfide and polysulfone substrates, polyester substrates, polyurethane substrates, and the like. Other substrates which the receptor laden thermoplastic compositions of the present invention may be used on include paper, wood, styrene, butadiene substrates, expanded polystyrene, nylon, fiberglass reinforced plastics including SMC and BMC and the like. By films, it is intended that the receptor laden thermoplastic composition of the present invention may cast as free standing films or sealants which are readily adhered to a substrate, as well as other types of functional or aesthetic coating applications. These plastics may be coated or, in fact, bonded for the fabrication of parts used in any number of industries including the aerospace and aircraft industries, marine and recreational products industries, as well as the automotive, rail and truck industries.

Non-plastic substrates to which the receptor laden thermoplastic compositions may be applied include glass, wood, and metals such as aluminum, copper and copper alloys including brass, lead, stainless steel, tin, paper, galvanized steel, as well as plastic, metal alloys or thermoplastic elastomers, olefins, or polyesters.

Working Examples

The following examples illustrate the preparation of receptor containing thermoplastic compositions in accorance with the present invention. These working examples should be viewed as illustrative and not as limiting of the present invention.

Working Example I

Various phosphate receptors were tested for radio frequency activity in a stray environment. Specifically, 185 to 195 milliamps of radio frequency energy at a frequency of 27.12 MHz was applied and the temperature change was measured over the given period of time. Below you will find the working examples segregated into Examples 1A through 1K.

| Example 1A: | 3 gm Pentaerythritol/No heat rise. | |
|---|---|---|
| Example 1B: | 3 gm of Calcium Carbonate/No response. | |
| Example 1C: | 2.5 grams of Tri (Beta Chloropropyl) Phosphate. | |
| | Temp. Change | Time |
| | RT - 224F | 1 min 55 sec |
| Example 1D: | Tributyl phosphate. | |
| | Temp. Change | Time |
| | RT - 100F | 120 sec. |
| Example 1E: | Tri (Beta, Beta Dichloro isopropyl) Phosphate | |
| | Temp. Change | Time |
| | RT - 151F | 19 sec |
| | RT - 151F | 18 sec |
| | RT - 224.4F | 49 sec |
| Example 1F: | Propylated triphenyl phosphate | |
| | Temp. Change | Time |
| | RT - 151F | 29 sec |
| | RT - 224.4F | 181 sec |
| Example 1G: | Butylated triphenyl phosphate | |
| | Temp. Change | Time |
| | RT - 151F | 55 sec |
| | RT - 224F | 92 sec |
| | RT - 151F | 31 sec |
| | RT - 224F | 107 sec |
| Example 1H: | Tri cresyl Phosphate. | |
| | Temp. Change | Time |
| | RT - 151F | 29 sec |
| | RT - 224F | 82 sec |
| | RT - 151F | 28 sec |
| | RT - 224F | 92 sec |
| Example 1I: | Dimethyl Methyl Phosphonate. | |
| | Temp. Change | Time |
| | RT - 224F | 26 sec |
| | RT - 151F | 21 sec |
| | RT - 224F | 29 sec |
| Example 1J: | Diether N,N-Bis (2-hydroxy ethyl) amino methyl phosphonate. | |
| | Temp. Change | Time |
| | RT - 151F | 3 sec |
| | RT - 202F | 6 sec |
| Example 1K: | Tri (Beta Chloro Ethyl) Phosphate. | |
| | Temp. Change | Time |
| | RT - 151F | 59 sec |
| | RT - 224F | 102 sec |

Working Example II

A receptor composition comprising 20% solid quarternary salt and 80% dimethyl methyl phosphonate was then formulated in a 250 milliliter beaker by introducing a quarternary salt first and then adding the dimethyl methyl phosphate with a stirrer at 150° F. Once this composition was dissolved it was cooled and placed in a glass jar. The composition was then tested for RF sensitivity by applying 215 milliamps through a stray field to the composition for 0 to 5 seconds. As can be seen below, the temperature change over that time period for each of five samples range as high as 353° F. from the initial room temperature for each of the five samples.

|  | Wt-% | Grams |
| --- | --- | --- |
| 1. CA-100 | 20 | 8.1 $CH_3CH_2N(CH_3)_2(C_{12-14}$ alkyl) |
| 2. DMMP | 80 | 32.4 Dimethyl methyl phosphonate |
|  | 100 | 40.5 |

| Example | Temp. Change | Time |
| --- | --- | --- |
| 2A | RT - 224.4° F. | 3 sec |
| 2B | RT - 299.3° F. | 2.4 sec |
| 2C | RT - 353.3° F. | 1.7 sec |
| 2D | RT - 353.1° F. | 4.1 sec |
| 2E | RT - 353.1° F. | 2.6 sec |

Working Example III

Testing was then undertaken to determine the sensitivity of certain RF receptors. The first composition was formulated by mixing 20 wt-% quarternary ammonium salt ($CH_3CH_2N(CH_3)_2(C_{12-14}$ alkyl)Cl) and 80 wt-% 1, 4 butanediol. When a 2.5 gram sample of this mixture was subjected to 215 milliamps of RF frequency at 27.12 Mghz, the sample increased in temperature from room temperature to 151° F. in 6.4 seconds. A second sample was subjected to 295 milliamps at 27.12 Mghz and after 23 seconds, the temperature increased from room temperature to 252° F.

Working Example IV

A second mixture of 20 wt-% of quarternary ammonium salt ($CH_3CH_2N(CH_3)_2(C_{12-14}$ alkyl)Cl) and 80% 1,4 butanediol were mixed. 2.5 gram samples were then subjected to an RF energy at varying milliamp ranges and 27.12 MHz frequency. At times ranging from 5 seconds to 20 seconds, the samples increased in temperature from room temperature to 328° F. The receptor compositions of Working Example X seemed to generate less heat than those of Working Example XI.

Wording Example V

A control receptor composition was prepared by mixing 1 gram of polycarbonate granules with 3 grams of Frequon C-20, (a control sulfonamide receptor available from Struktol Inc. of Ohio) until the polycarbonate was thoroughly wet out. A 100 milliliter polyethylene plastic cup was then inverted and 2-3 grams of the composition was placed on the base of the cup. The composition was then heated with RF energy using a stray field system at 27.12 MHz. After two minutes at 205 milliamps the polycarbonate began to fuse. After three minutes a hole resulted in the bottom of the polyethylene cup at which time the experiment was ended.

Working Example VI

Another sample of the material prepared in Example V was placed in a 20 milliliter glass pyrex beaker. The beaker was precoated with a mold release compound commonly used in the production of composites RF energy was then applied to the beaker under the same conditions of Working Example I. It was difficult to get good application of RF energy due to the shape of the beaker. After five minutes the composition began to melt and flow.

Working Example VII

Using the same material as prepared in Working Example V, additional material was placed on a fiberglass mat which was in turn placed on an inverted 100 milliliter cup. Applying RF energy to the system under the same conditions as in Working Example I, the polycarbonate melted in three minutes.

Working Example VIII

To ascertain the RF sensitivity of the quaternary cationics of the present invention, 2.1875 grams of polycarbonate granules are combined with 0.3125 grams of catufur PP50 ($CH_3CH_2N^+$ $(CH_3)_2RCL^-$ wherein R equals $C_{12-14}$ - 20%; 80% 1,4-butane diol) were mixed under ambient conditions until the polycarbonate granules were completely wet out. A plastic cup similar to that used in Working Example V was inverted and 2 to 3 grams of the mixture was applied to the inverted cup. RF energy was then applied to the composition under the conditions set forth in Working Example I. After 14 seconds the composition has melted and fused to the upper surface of the inverted cup.

Working Example IX

A comparison was then undertaken using a bismaleamide resin (MDAB/5292B from Mobax Chemical). In this instance, the resin was placed in a 500 milliliter polyethylene cup having a 24 ounce glass placed over the top of it. RF energy was then applied under the same conditions as that used in Example V. The bismaleamide resin showed a very slight heating response and melted over time.

Working Example X

The same resin used in Working Example IX was then heated under RF conditions. It took five minutes to heat the material (2 grams) from room temperature to 252.5° F. at 185-190 milliamps with no sensitizers added. The heating was completed in a 100 milliliter polyethylene cup. These results show that the material is lossy enough to respond slightly to radio frequency energy.

Working Example XI

A 50 gram batch of the bismaleamide-receptor resin is then prepared using the resin of Working Example IX at 95% and the receptor shown in Working Example IV at 5%. Under its conditions shown in Example VI, the bismaleamide resin is melted using a receptor and RF energy.

Working Example XII

A receptor composition was then formulated by mixing 38.2 grams of quaternary ammonium salt (40 wt-%) with 57.3 grams of m-pyrol (60 wt-%). The receptor composition was mixed by adding the m-pyrol to a 250 milliliter Erlenmeyer flask and then adding the quaternary ammonium salt ($CH_3CH_2N^+$ $(CH_3)_2RCl^-$ wherein R equals $C_{12-14}$ alkyl) and heating the composition to 150° F. until dissolved. Six Working Examples were then prepared.

Working Example XIIA comprised a sandwich of two layers of clear polycarbonate (Lexon LS111 from Standard Plaques), between which was placed two radiation resistant thermoplastic polyamide sheets known within the trade as Kapton sheets. These Kapton sheets were each 15 millimeters thick. Between the Kapton sheets was a polyimide known as Techimer 2001 (available from Fiber Resins, Inc.).

Working Example XIIB comprised a sandwich of two clear polycarbonate layers only.

Working Example XIIC comprised a control of two Kapton sheets without the Techimer 2001 polyimide adhesive.

Working Example XIID comprised the Techimer 2001 polyimide adhesive placed between two Kapton sheets.

Working Example XIIE comprised a dried film of Techimer 2001 without the Kapton sheets placed between the polycarbonate.

Working Example XIIF comprised polyimide adhesive mixed with 2% of the receptor composition previously formulated. This composition was then introduced between two Kapton sheets which were then held between two polycarbonate lenses.

In each instance, melting powders were placed in Working Example XIIA, B, C, E and F. Applying RF energy to the compositions at 70 MHz, under parallel plate conditions, none of Working Examples XIIA—E resulted in a bond between the Kapton sheets when these sheets were present. Only Working Example XIIF resulted in a bonding of the Kapton sheets.

The foregoing specification, examples and data provide a basis for understanding the invention. The invention can be made in a variety of embodiments without departing form the spirit and scope of the invention. Accordingly, the invention resides in the claims hereinafter appended.

I claim as my invention:

1. A method of applying a thermoplastic composition, said method comprising the steps of:
   (a) applying radio signals having a frequency of about 3 to 35 MHz at a voltage ranging from about 1000 to 50,000 volts and an average current ranging from about 0.05 amps to 5 amps to a composition comprising a major portion of thermoplastic and a receptor, said receptor having a dissipation factor of about 0.1 or greater and dielectric constant of at least about 0.1 or greater, said receptor selected from the group consisting of an alkali or alkaline earth metal sulfate salt, aluminum trihydrate, a quaternary ammonium salt, a phosphonate compounds, a phosphate compound, a polystyrene sulfonate sodium salt, or mixtures thereof;
   (b) applying said composition to a first substrate and applying a second substrate to said composition;
   (c) placing the first and second composition-laden substrates adjacent two plates and applying radio signals through said plates to the composition deposited between the first and second substrates; and
   (d) dissipating the radio signals received by the receptor as thermal energy in an amount effective to form said composition to a thermoplastic bond between said first and second substrates.

2. The method of claim 1 wherein said substrate comprises wood, metal, glass, plastic, or paper.

3. The method of claim 1 wherein said first substrate comprises a composition selected from the group consisting of wood, metal, glass, plastic, paper and mixtures thereof.

4. The method of claim 1 wherein said radio signals are applied to said heat curable composition for a period of time ranging from about 0.1 minute to about 60 minutes.

5. The method of claim 1 wherein said radio waves are applied to the composition through a conductive substrate.

6. The method of claim 1 wherein said first and second substrate are conductive and said radio waves are applied directly to the composition through said conductive substrates.

7. The method of claim 1 wherein said radio signals have a frequency of about 27.1 MHz.

8. The method of claim 1 wherein said radio signals are produced at a voltage ranging from about 1,000 volts to 10,000 volts.

9. The method of claim 1 wherein said plates are parallel and have a spacing ranging from about 0.001 inch to 20 inches.

10. The method of claim 9 wherein said plates have a spacing ranging from about 0.030 inch to 6 inches.

11. The method of claim 1 wherein said radio waves are emitted with an average ranging from about 0.2 amps to 0.3 amps.

12. The method of claim 1 wherein said second substrate comprises a composition selected from the group consisting of wood, metal, glass, plastic, paper, and mixtures thereof.

13. The method of claim 1 wherein said first substrate comprises a composite material.

14. The method of claim 1 wherein said first and second substrates comprise composite materials.

15. The method of claim 1 wherein said first substrate is conductive.

16. The method of claim 1 wherein said first and second substrates are conductive.

17. The method of claim 1 wherein said composition-laden first and second substrates are positioned between said first and second plates.

18. The method of claim 1 wherein said thermoplastic bond results from the application of a stray field of radio signals.

19. A method of applying a thermoplastic composition, said method comprising the steps of:
   (a) applying radio signals having a frequency of about 3 to 35 MHz at a voltage ranging from about 1000 to 50,000 volts and an average current ranging from about 0.05 amps to 5 amps to a composition comprising a major portion of thermoplastic and a receptor, said thermoplastic selected from the group consisting of a vinyl polymer, a polyester, a polyamide, a polyamide, a polyether, a block polyamide-polyether, a block polyester-polyether, a polycarbonate, a polysulfone, a polybisimidazole, a polybisoxazole, a polybisthiazole, a polyphenyl, a polyacetal, a polyester, a polyurethane, a polyphenyl-aniline sulfide, a polyolefin, a polyether ketone, butyl rubber, an ethylene vinyl acetate copolymer, a styrene block copolymer, or mixtures thereof, said receptor having a dissipation factor of about 0.1 or greater and a dielectric constant of at least about 0.1 or greater, said receptor selected from the group consisting of an alkali or alkaline earth metal sulfate salts, aluminum trihydrate, a quaternary ammonium salt, a phosphonate compound, a phosphate compound, a polystyrene sulfonate sodium salt, or mixtures thereof;
   (b) applying said composition to a first substrate and applying a second substrate to said composition;
   (c) placing the first and second receptor laden substrates between two plates and applying radio signals to the composition deposited between the first and second substrates; and (d) dissipating the radio signals received by the receptor as thermal energy in an amount effective to form said composition to a thermoplastic bond between said first and second substrates.

20. The method of claim 19 wherein said first substrate is conductive.

21. The method of claim 19 wherein said first and second substrates are conductive.

22. The method of claim 19 wherein said first substrate or said second substrate comprises a material selected from the group consisting of wood, metal, glass, plastic, paper, and mixtures thereof.

* * * * *

UNITED STATES PATENT AND TRADEMARK OFFICE
CERTIFICATE OF CORRECTION

PATENT NO. : 5,328,539
DATED : July 12, 1994
INVENTOR(S) : Norman J. Sato It is certified that error appears in the above-identified patent and that said Letters Patent is hereby corrected as shown below:

Column 10, Line 46, insert --RT 151 F-- (under time change) and under "time" insert --22 sec--.

Signed and Sealed this

Twenty-first Day of March, 1995

Attest:

BRUCE LEHMAN

*Attesting Officer*          *Commissioner of Patents and Trademarks*